US011545903B1

(12) United States Patent
Li (10) Patent No.: US 11,545,903 B1
(45) Date of Patent: Jan. 3, 2023

(54) CONTROLLER FOR DRIVING A POWER SWITCH IN SLAVE PHASE OF A MULTIPHASE POWER CONVERTER AND POWER CONVERTER COMPRISING THE SAME

(71) Applicant: Monolithic Power Systems, Inc., San Jose, CA (US)

(72) Inventor: Yan-Cun Li, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

(21) Appl. No.: 17/541,591

(22) Filed: Dec. 3, 2021

(51) Int. Cl.
*H02M 3/158* (2006.01)
*H02M 1/00* (2006.01)
*H02M 3/335* (2006.01)

(52) U.S. Cl.
CPC ....... *H02M 3/1586* (2021.05); *H02M 1/0006* (2021.05); *H02M 1/0043* (2021.05); *H02M 3/33523* (2013.01)

(58) Field of Classification Search
CPC ............. H02M 3/1584; H02M 3/1586; H02M 3/33523; H02M 1/0006; H02M 1/00
See application file for complete search history.

(56) References Cited

U.S. PATENT DOCUMENTS

| | | | | |
|---|---|---|---|---|
| 10,270,343 B2* | 4/2019 | Nguyen | ............... | H02M 3/1584 |
| 11,139,735 B2* | 10/2021 | Deng | .................... | H02M 3/073 |
| 11,387,736 B2* | 7/2022 | Luo | ......................... | H02M 1/36 |
| 2018/0191251 A1* | 7/2018 | Tao | .......................... | H02M 1/08 |
| 2021/0167688 A1* | 6/2021 | Hureau | ............... | H02M 3/1584 |
| 2021/0194357 A1* | 6/2021 | Zhang | ..................... | H02M 1/08 |

* cited by examiner

*Primary Examiner* — Jue Zhang
(74) *Attorney, Agent, or Firm* — Perkins Coie LLP (57) ABSTRACT

A power converter includes a controller for driving a power switch in one phase of a plurality of phases of the power converter. The controller may have a first terminal for receiving an input switch driving signal which is used to drive a power switch in another phase of the power converter, and a second terminal for providing an output switch driving signal to drive the power switch in the one phase. The controller draws power from the input switch driving signal received at the first terminal, and is configured to provide the output switch driving signal based on the input switch driving signal.

20 Claims, 5 Drawing Sheets

CONTROLLER FOR DRIVING A POWER SWITCH IN SLAVE PHASE OF A MULTIPHASE POWER CONVERTER AND POWER CONVERTER COMPRISING THE SAME

TECHNICAL FIELD

The present invention generally relates to electronic circuits, and more particularly but not exclusively, to switch controller for driving a power switch and associated power converters comprising the switch controller.

BACKGROUND

Multiphase power converters are widely used in various applications. However, existing multiphase power converters such as interleaving boost power factor correction ("PFC") converter and interleaving flyback converter need complex controller/controllers to drive master phase and slave phases of the multiphase power converters. Moreover, different controllers need to be specifically designed for different multiphase power converters of different topologies. In addition, simple and cost effective solutions to power the controllers of the slave phases and to realize communications between driving signal(s) of the master phase and driving signals of the slave phases of a multiphase power converter are desired.

SUMMARY

Embodiments of the present invention are directed to a power converter having a plurality of N phases with each one of the N phases comprising a power switch, N being an integer greater than 1 and representing the total number of phases that the power converter has. The power converter may include: a corresponding plurality of N controllers, corresponding to the plurality of N phases, wherein each one of the N controllers is configured to drive a corresponding one power switch in a corresponding one phase of the plurality of N phases; and wherein the first controller of the plurality of N controllers is configured as a master controller to provide a first switch driving signal; and wherein for each i from 2 to N, the $i^{th}$ controller of the plurality of N controllers is configured to receive the $(i-1)^{th}$ switch driving signal from the $(i-1)^{th}$ controller at a first terminal of the $i^{th}$ controller, and is further configured to draw power from the $(i-1)^{th}$ switch driving signal, and is further configured to provide an $i^{th}$ switch driving signal at a second terminal of the $i^{th}$ controller based on the $(i-1)^{th}$ switch driving signal, and wherein i is an integer.

Embodiments of the present invention are also directed to a controller adapted for driving a power switch in one phase of a power converter having a plurality of phases. The controller may include: a first terminal, configured to receive an input switch driving signal which is used to drive a power switch in another phase of the power converter; and a second terminal, configured to provide an output switch driving signal to drive the power switch in the one phase; wherein the controller is configured to draw power from the input switch driving signal received at the first terminal, and is further configured to provide the output switch driving signal based on the input switch driving signal.

Embodiments of the present invention are further directed to a power converter, comprising: a first controller, configured as a master controller to provide a first switch driving signal to drive a power switch in a master phase of the power converter; and a second controller, configured as a slave controller to receive the first switch driving signal from the master controller, and is further configured to draw power from the first switch driving signal, and is further configured to provide a second switch driving signal based on the first switch driving signal.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 1:
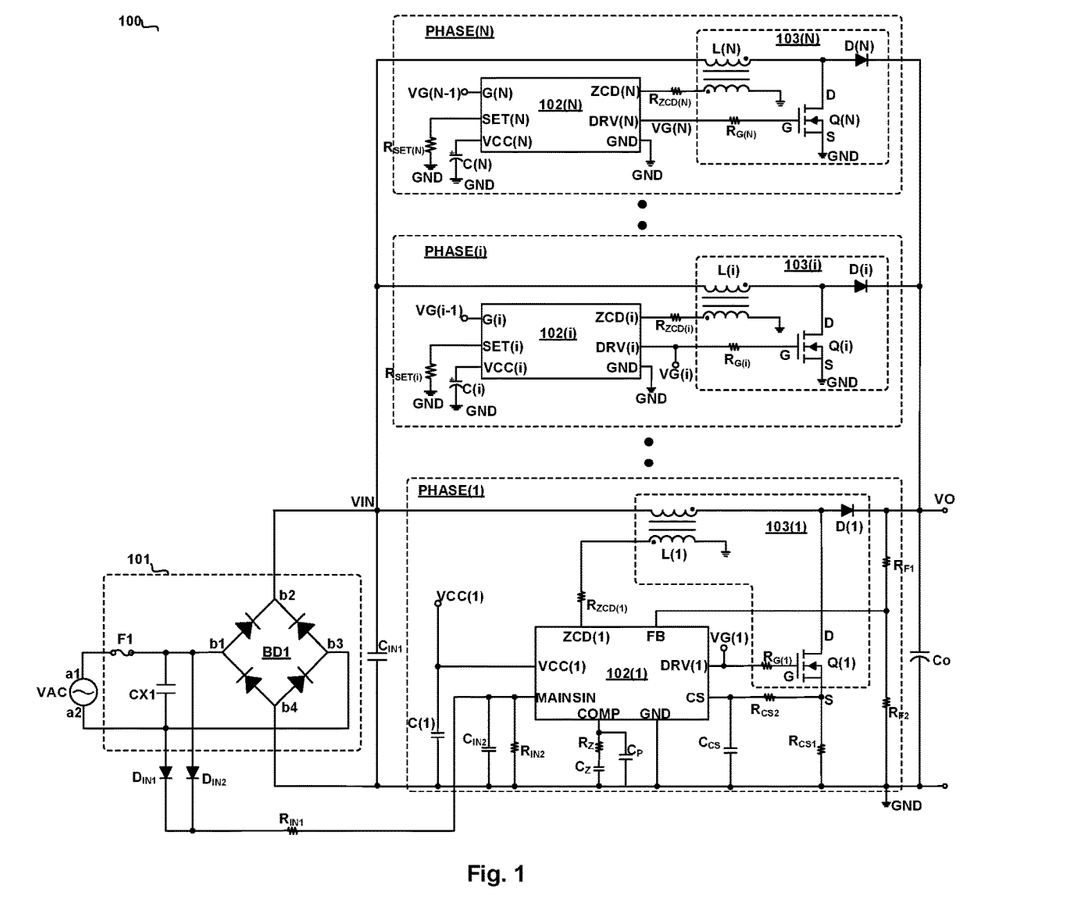
FIG. 1 schematically illustrates a power converter 100 in accordance with an exemplary embodiment of the present invention.

FIG. 1 schematically illustrates a power converter 100 in accordance with an exemplary embodiment of the present invention. The power converter 100 may include a rectification unit 101 for rectifying an alternating current ("AC") input signal VAC to output a rectified direct current ("DC") supply signal VIN. The power converter 100 may further comprise a plurality of N power conversion phases {PHASE (i), i=1, 2, . . . , N} coupled in parallel between a first node (e.g. a DC input node) IN and a second node (e.g. an output node) OUT, wherein N is an integer greater than 1 and represents the total number of power conversion phases that the power converter 100 may include which may be set or determined by customers/users in practical applications depending on real application requirements. That is to say, the indice i is a variable traverses the integers from 1 to N. Each one of the plurality of (e.g. N) power conversion phases {PHASE(i), i=1, 2, . . . , N}, including all the sub-circuits and elements that each power conversion phase PHASE(i) may comprise, may be configured to use a reference ground potential at a third node GND of the power converter 100 as a ground potential of each power conversion phase PHASE(i). An input capacitor $C_{IN1}$ may be coupled across the first node IN and the third node GND of the power converter 100. The first node IN may be configured to receive the rectified DC supply signal VIN in an embodiment. An output capacitor Co may be coupled across the second node OUT and the third node GND of the power converter 100.

In accordance with an embodiment of the present disclosure, the rectification unit 101 may exemplarily comprise four diodes connected into a full bridge BD1 having a first terminal b1 coupled to a first terminal a1 of an AC source via a fuse F1, a second terminal b2 connected to the first node IN, a third terminal b3 connected to a second terminal a2 of the AC source and a fourth terminal b4 connected to the third node GND of the power converter 100. The AC source may be configured to provide the AC input signal VAC. A capacitive device CX1 may be coupled between the first terminal b1 and the third terminal b3 of the full bridge BD1.

In accordance with an embodiment of the present disclosure, for each i from 1 to N, the $i^{th}$ power conversion phase PHASE(i) of the N power conversion phases {PHASE(i), i=1, 2, . . . , N} may comprise an $i^{th}$ power stage 103(i) including an $i^{th}$ power switch Q(i) and a corresponding $i^{th}$ controller 102(i) for driving the $i^{th}$ power switch Q(i) to perform on and off switching. Therefore, it would be understood that the power converter 100 having the N power conversion phases {PHASE(i), i=1, 2, . . . , N} may include N power switches {Q(i), i=1, 2, . . . , N} and N controllers {102(i), i=1, 2, . . . , N}, with each one of the N controllers {102(i), i=1, 2, . . . , N} configured to drive a corresponding one of the N power switches {Q(i), i=1, 2, . . . , N} in a corresponding one of the N power conversion phases {PHASE(i), i=1, 2, . . . , N}. In an embodiment, the first power conversion phase PHASE(1) of the N power conversion phases {PHASE(i), i=1, 2, . . . , N} may be configured as a master phase, and the first controller 102(1) of the N controllers {102(i), i=1, 2, . . . , N} may be configured as a master controller to provide a first switch driving signal VG(1). The first switch driving signal VG(1) may be a high-low logic switching signal having a switching period $T_{(1)}$, and a high logic pulse and a low logic pulse in each switching period $T_{(1)}$, and may be configured to drive the first power switch Q(1) of the N power switches {Q(i), i=1, 2, . . . , N}.

In the exemplary embodiment shown in FIG. 1, for each i from 1 to N, the $i^{th}$ power stage 103(i) of the $i^{th}$ power conversion phase PHASE(i) may be configured to have a boost power factor correction ("PFC") topology. For instance, for each i from 1 to N, the $i^{th}$ power stage 103(i) may comprise the $i^{th}$ power switch Q(i) having a first terminal D coupled to the first node IN through an $i^{th}$ inductive power storage device L(i) and coupled to the second node OUT through an $i^{th}$ diode D(i), a second terminal S coupled to the third node GND, and a control terminal G coupled to the $i^{th}$ controller 102(i), e.g. with or without a gating resistive device $R_{G(i)}$. The gating resistive device $R_{G(i)}$ may comprise parasitic resistances. The first controller 102(1) configured as a master controller may comprise any controller suitable to generate a master switch driving signal (i.e. the first switch driving signal VG(1)) to drive the first power stage 103(1) having the boost PFC topology. For instance, the commercially available controller MP44018A manufactured by Monolithic Power System Inc. may be used as the first controller 102(1). In the example of FIG. 1, the first controller 102(1) may have a first terminal (e.g. a feedback terminal) FB that may be configured/used to receive a feedback signal indicative of an output voltage VO at the second node OUT of the power converter 100, a second terminal (e.g. a driver output terminal) DRV(1) that may be configured/used to provide the first switch driving signal VG(1), a third terminal (e.g. a regulated power terminal) VC(1) that may be configured/used to allow connection of a first capacitive device C(1) for storing energy to generate a regulated voltage signal VCC(1) that may be used as an internal supply voltage for the first controller 102(1), and a fourth terminal (e.g. a ground terminal) GND(1) that may be configured/used to allow connection to the third node GND (or the reference ground potential) of the power converter 100. The first controller 102(1) may at least comprise a voltage feedback loop that may be configured to generate the first switch driving signal VG(1) based at least partially on the feedback signal received at the first terminal FB. The first controller 102(1) may further comprise other terminals, for example a fifth terminal (e.g. a current sense terminal) CS that may be configured/used to sense a current flowing through the first power switch Q(1) to generate a current sense signal. The first controller 102(1) may further be configured to regulate the first switch driving signal VG(1) based on the current sense signal. The first controller 102(1) may further comprise a sixth terminal (e.g. a compensation terminal) COMP that may be configured to allow connection to a compensation network (e.g. comprising a capacitor Cp in parallel connection with a series connected resistor Rz and a capacitor Cz) to improve stability of the voltage feedback loop. The first controller 102(1) may further comprise a seventh terminal (e.g. a zero-cross detection ("ZCD") terminal) ZCD(1) that may be configured/used to allow connection, e.g. through a first ZCD resistor $R_{ZCD(1)}$, to the first inductive power storage device L(1) to detect whether a current flowing through the first inductive power storage device L(1) is crossing zero (or ideally is having a zero current value). The first controller 102(1) may further comprise an eighth terminal (e.g. a power supply terminal) MAINSIN that may be configured/used to sense a rectified voltage of the AC input signal VAC and a voltage on the MAINSIN terminal may be used for providing brown-in and brownout protections and feed-forward compensation to a voltage on the COMP terminal. In the example of FIG. 1, it is exemplarily illustrated that the eighth terminal MAINSIN is coupled to the second terminal a2 of the AC source through a first input resistor $R_{IN1}$ and a first input diode $D_{IN1}$, and further coupled to the first terminal b1 or the third terminal b3 of the full bridge BD1 through the first input resistor $R_{IN1}$ and a second input diode $D_{IN2}$ to sense the rectified voltage of the AC input signal VAC. A second input capacitor $C_{IN2}$ and a second input resistor $R_{IN2}$ may be coupled in parallel between the eighth terminal MAINSIN and the third node GND of the power converter 100. The first input resistor $R_{IN1}$ and the second input resistor $R_{IN2}$ constitute a resistive voltage divider to scale down the rectified voltage of the AC input signal VAC to the voltage on the eighth terminal MAINSIN. One of ordinary skill in the art should understand that this is just to provide an example and not intended to be limiting.

For each i from 2 to N (i.e., here i is a variable traverses the integers from 2 to N), the $i^{th}$ controller 102(i) of the N controllers {102(i), i=1, 2, . . . , N} may have a first terminal (e.g. a power supply terminal) G(i) that may be configured/used to receive the $(i-1)^{th}$ switch driving signal VG(i-1) from the $(i-1)^{th}$ controller 102(i-1). The $i^{th}$ controller 102(i) may further be configured to draw power from the $(i-1)^{th}$ switch driving signal VG(i-1). That is to say, the $i^{th}$ controller 102(i) is powered by the $(i-1)^{th}$ switch driving signal VG(i-1) or operation power of the $i^{th}$ controller 102(i) is provided by the $(i-1)^{th}$ switch driving signal VG(i-1). For each i from 2 to N (i.e., here i is a variable traverses the integers from 2 to N), the $i^{th}$ controller 102(i) of the N controllers {102(i), i=1, 2, . . . , N} may be configured/used as a slave controller and may further have a second terminal (e.g. a driver output terminal) DRV(i), and may further be configured to provide an $i^{th}$ switch driving signal VG(i) at the second terminal DRV(i) based on the $(i-1)^{th}$ switch driving signal VG(i-1). One of ordinary skill in the art would understand that the $(i-1)^{th}$ switch driving signal VG(i-1) can be considered as an input switch driving signal to the $i^{th}$ controller 102(i), and the $i^{th}$ switch driving signal VG(i) can be considered as an output switch driving signal of the $i^{th}$ controller 102(i) which may be used to drive the $i^{th}$ power switch Q(i) of the $i^{th}$ power conversion phase PHASE (i), for each i from 2 to N (i.e., here i is a variable traverses the integers from 2 to N). Therefore, in the exemplary embodiment of FIG. 1, it can be understood that for each i from 2 to N (i.e., here i is a variable traverses the integers from 2 to N), the $i^{th}$ controller 102(i) on the one hand draws power from the $(i-1)^{th}$ switch driving signal VG(i-1) and on the other hand generates the $i^{th}$ switch driving signal VG(i) based on the $(i-1)^{th}$ switch driving signal VG(i-1) from the $(i-1)^{th}$ controller. For instance, the $2^{nd}$ controller 102(2) on the one hand draws power from the $1^{st}$ switch driving signal VG(1) and on the other hand generates the $2^{nd}$ switch driving signal VG(2) based on the $1^{st}$ switch driving signal VG(1) from the $1^{st}$ controller 102(1) which is configured as the master controller. For each i from 2 to N (i.e., here i is a variable traverses the integers from 2 to N), powering the $i^{th}$ controller 102(i) of the $i^{th}$ phase PHASE(i) by the $(i-1)^{th}$ switch driving signal VG(i-1) of the $(i-1)^{th}$ phase PHASE (i-1) may have several advantages. The $(i-1)^{th}$ switch driving signal VG(i-1) may be a high-low logic switching signal having a switching period $T_{(i-1)}$, and a high logic pulse and a low logic pulse in each switching period $T_{(i-1)}$, and may generally have a well-regulated voltage amplitude for instance in the range of 10V~20V relative to the reference ground potential of the power converter 100, the $i^{th}$ controller 102(i) in accordance with various embodiments of the present invention drawing power from the $(i-1)^{th}$ switch driving signal VG(i-1) may not require internal regulators that should be high voltage tolerant. "High voltage" here in an example may refer to voltages higher than the voltage amplitude (e.g. 10V~20V) of the low side switch driving signal VGL, in another example may refer to voltages even higher than 20V up to 100V, or in still another example may refer to voltages higher than 100V up to 1500V. And thus, high voltage tolerant devices are not needed, reducing complexity and cost of design of the $i^{th}$ controller 102(i).

In accordance with an embodiment of the present disclosure, for each i from 2 to N (i.e., here i is a variable traverses the integers from 2 to N), the $i^{th}$ controller 102(i) may further have a third terminal (e.g. a regulated power terminal) VC(i) and a fourth terminal (e.g. a ground terminal) GND(i), wherein the $i^{th}$ controller 102(i) may be further configured to allow connection of an $i^{th}$ capacitive device C(i) between its third terminal VC(i) and its fourth terminal GND(i) for storing energy to provide a regulated voltage signal VCC(i). For instance, when the $i^{th}$ capacitive device C(i) is coupled between the third terminal VC(i) and the fourth terminal GND(i) of the $i^{th}$ controller 102(i), it may get charged when the $(i-1)^{th}$ switch driving signal VG(i-1) is provided at the first terminal G(i) of the $i^{th}$ controller 102(i) to provide the regulated voltage signal VCC(i), for each i from 2 to N (i.e., here i is a variable traverses the integers from 2 to N).

In accordance with an embodiment of the present disclosure, for each i from 2 to N (i.e., here i is a variable traverses the integers from 2 to N), the $i^{th}$ controller 102(i) may further be configured to phase shift the $(i-1)^{th}$ switch driving signal VG(i-1) by $T_{(i-1)}/N$ to generate the $i^{th}$ switch driving signal VG(i). That is to say, theoretically and technically, for each i from 2 to N (i.e., here i is a variable traverses the integers from 2 to N), the $i^{th}$ controller 102(i) may be configured to generate the $i^{th}$ switch driving signal VG(i) by duplicating the $(i-1)^{th}$ switch driving signal VG(i-1) with a $T_{(i-1)}/N$ time delay added to the $(i-1)^{th}$ switch driving signal VG(i-1). The $i^{th}$ switch driving signal VG(i), for each i from 2 to N (i.e., here i is a variable traverses the integers from 2 to N), may thus also be a high-low logic switching signal having a switching period $T_{(i)}$ and a high logic pulse and a low logic pulse in each switching period $T_{(i)}$, and having a $T_{(i-1)}/N$ time delay from the $(i-1)^{th}$ switch driving signal VG(i-1) at every rising edge, wherein the switching period $T_{(i)}$ may be substantially equal to the switching period $T_{(i-1)}$ of the $(i-1)^{th}$ switch driving signal VG(i-1) and a pulse width $t_{on(i)}$ of the $i^{th}$ switch driving signal VG(i) may be substantially equal to a pulse width $t_{on(i-1)}$ of the $(i-1)^{th}$ switch driving signal VG(i-1). Herein, for each i from 1 to N, the pulse width $t_{on(i)}$ of the $i^{th}$ switch driving signal VG(i) may refer to a width (or a time duration) of a high logic pulse during each one switching period $T_{(i)}$ of the $i^{th}$ switch driving signal VG(i). In accordance with an exemplary embodiment, for each i from 2 to N (i.e., here i is a variable traverses the integers from 2 to N), the $i^{th}$ controller 102(i) may further comprise a fifth terminal (e.g. a setting terminal) SET(i) that may be configurable to set a phase shift of $T_{(i-1)}/N$ (i.e. the $T_{(i-1)}/N$ time delay) to the $i^{th}$ switch driving signal VG(i) from the $(i-1)^{th}$ switch driving signal VG(i-1). For instance, for each i from 2 to N (i.e., here i is a variable traverses the integers from 2 to N), the $i^{th}$ controller 102(i) may be configured to, for example, allow customers or users to set the $T_{(i-1)}/N$ time delay by connecting an external setting device to the setting terminal SET(i) or by providing a configuration signal to the setting terminal SET(i). In this fashion, except the first controller 102(1) which is a master controller, the remained (N-1) controllers {102(i), i=2, . . . , N} may be identical slave controllers (i.e. having identical terminals/pins, functions, internal circuits and configurations etc.) that are different from the master controller 102(1). For instance, each one of the slave controllers {102(i), i=2, ..., N} may comprise an identical controller that may be formed into a single integrated circuit chip or a single integrated circuit die and may be "universally" used for co-working with any master controller to configure/form interleaving multiphase power converter of any topology, and thus may be referred to as a "universal" controller hereafter in this disclosure. This can greatly facilitate customers/users in practical applications to form a power converter of any number N (N≥2) of phases despite of the converter topology according to various application requirements. In addition, such a "universal" controller used as a slave controller, e.g. the $i^{th}$ controller 102(i) (i from 2 to N) described above, may not require complex internal circuits to form regulation feedback loops as the master controller (e.g. the $1^{st}$ controller 102(1) described above) does, it may simply duplicate and phase-shift the $(i-1)^{th}$ switch driving signal VG(i−1) from an immediately preceding $(i-1)^{th}$ phase PHASE(i−1) to provide the $i^{th}$ switch driving signal VG(i) that is used to drive the $i^{th}$ power switch Q(i) in the current $i^{th}$ phase PHASE(i). The master controller, e.g. the $1^{st}$ controller 102(1) of the master phase PHASE(1), completes the complex regulation feedback loops. Therefore, the "universal" controller according to various embodiments of the present invention allows more flexibility, and reduces design complexity and cost for customers/users to configure interleaving multiphase power converters.

Figure 2:
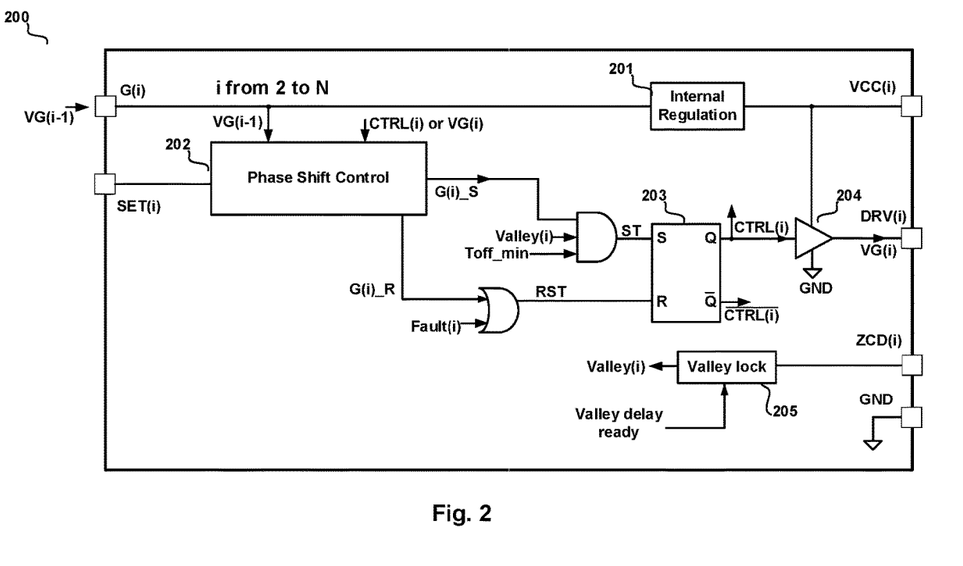
FIG. 2 schematically illustrates a controller 200 for driving a power switch in one phase of a power converter having a plurality of phases in accordance with an embodiment of the present invention.
Figure 5:
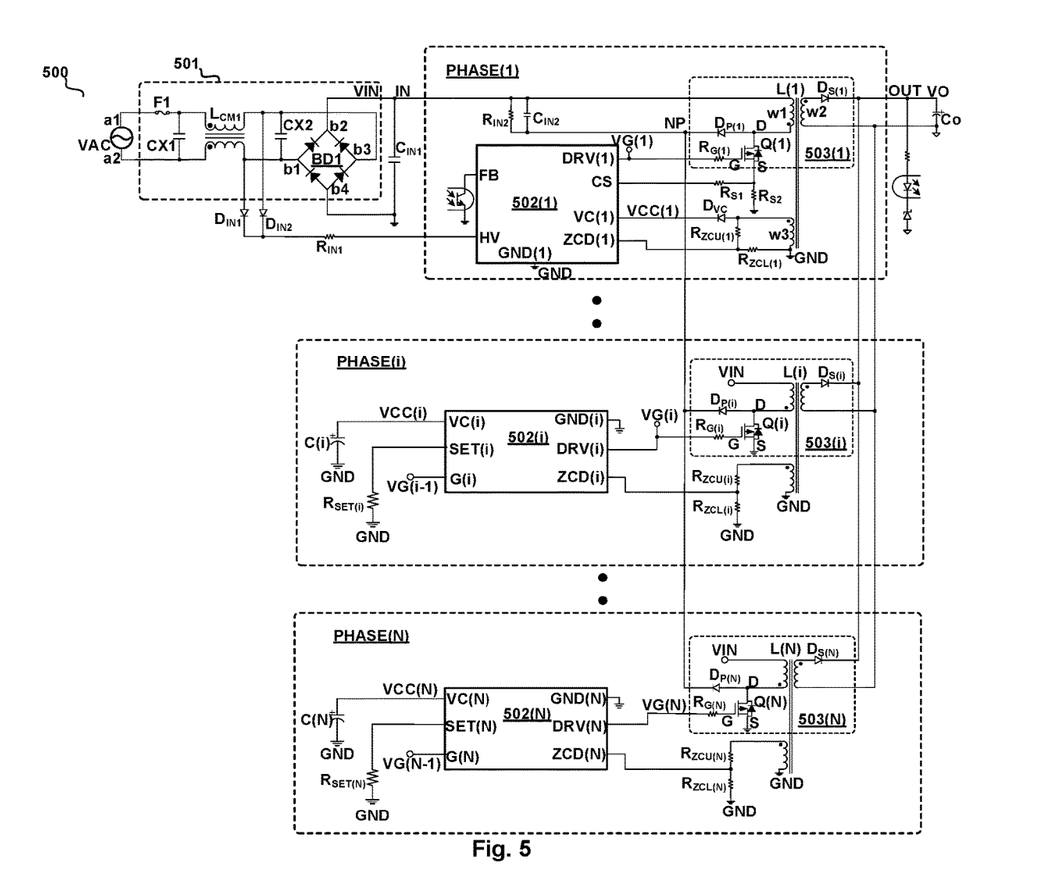
FIG. 5 schematically illustrates a power converter 500 in accordance with another exemplary embodiment of the present invention.

FIG. 2 schematically illustrates a controller 200 for driving a power switch in one phase of a power converter (e.g. the power converter 100 as shown in FIG. 1 or the power converter 500 as shown in FIG. 5 that will be described later) having a plurality of phases in accordance with an embodiment of the present invention. The controller 200 may be used as the "universal" controller mentioned above which may be "universally" used for co-working with any master controller to configure/form a power converter of any number N (N≥2) of phases despite of the converter topology. For example, the controller 200 may be configured as the $i^{th}$ slave controller 102(i) of the power converter 100, for each i from 2 to N (i.e., here i is a variable traverses the integers from 2 to N). Namely, for each i from 2 to N (i.e., here i is a variable traverses the integers from 2 to N), the $i^{th}$ controller 102(i) of the power converter 100 may comprise an identical controller e.g. the controller 200. The controller 200 may be formed into a single integrated circuit chip or a single integrated circuit die and may be a "universal" controller that can co-work with any master controller to configure/form interleaving multiphase power converter. The controller 200 may have a first terminal (e.g. a power supply terminal) G(i) that may be configured/used to receive an input switch driving signal VG(i−1) which is used to drive a power switch in another phase of the power converter. The controller 200 may further have a second terminal (e.g. a driver output terminal) DRV(i) that may be configured/used to provide an output switch driving signal VG(i) to drive the power switch in the one phase. The controller 200 may be configured to draw power from the input switch driving signal VG(i−1) received at the first terminal G(i−1), and may further be configured to provide the output switch driving signal VG(i) based on the input switch driving signal VG(i−1). The controller 200 may further have a third terminal (e.g. a regulated power terminal) VCC(i) and a fourth terminal (e.g. a ground terminal) GND, and may further be configured to provide a regulated voltage signal (e.g. VCC(i)) when a capacitive device (e.g. C(i)) is coupled between its third terminal VC(i) and its fourth terminal GND(i). The controller 200 may further be configured to phase shift the input switch driving signal VG(i−1) by $T_{(i-1)}/N$ to generate the output switch driving signal VG(i), wherein $T_{(i-1)}$ is a switching period of the input switch driving signal VG(i−1) and N is the total number of the plurality of phases of the power converter. That is to say, theoretically and technically, the controller 200 may be configured to generate the output switch driving signal VG(i) by duplicating the input switch driving signal VG(i−1) with a $T_{(i-1)}/N$ time delay added to the input switch driving signal VG(i−1). The controller 200 may further have a fifth terminal (e.g. a setting terminal) SET(i) that may be configurable to set the phase shift of $T_{(i-1)}/N$ (i.e. the $T_{(i-1)}/N$ time delay) to the output switch driving signal VG(i) from the input switch driving signal VG(i−1). For example, when used as the $i^{th}$ controller 102(i) for driving the $i^{th}$ power switch Q(i) of one phase (i.e. the $i^{th}$ phase) PHASE(i) of the power converter 100 in the example of FIG. 1, the controller 200 may be configured to receive the $(i-1)^{th}$ switch driving signal VG(i−1) as an input switch driving signal from the $(i-1)^{th}$ controller 102(i−1) which is used to drive the $(i-1)^{th}$ power switch Q(i−1) in another phase (i.e. the $(i-1)^{th}$ phase) PHASE(i−1) of the power converter 100, for each i from 2 to N (i.e., here i is a variable traverses the integers from 2 to N).

In accordance with an exemplary embodiment, still referring to FIG. 2, the controller 200 may comprise an internal regulation module 201, coupled between the first terminal G(i) and the third terminal VC(i) of the controller 200, and configured to convert the input switch driving signal VG(i−1) into the regulated voltage signal VCC(i) when the capacitive energy storage device is coupled between the third terminal and the fourth terminal GND(i) of the controller 200. In an embodiment, the internal regulation module 201 may comprise for instance, a rectifier (e.g. MOSFET or diode) that is configured to be conductive in a direction from the first terminal G(i) to the third terminal VC(i) of the controller 200 and be reverse blocking (non-conductive) in a direction from the third terminal VC(i) to the first terminal G(i) of the controller 200. In an alternative embodiment, the internal regulation module 201 may comprise a regulator (e.g. LDO regulator) instead of a rectifier. Since the voltage amplitude of the input switch driving signal VG(i−1) may generally be in the range of 10V~20V relative to the reference ground potential at the third node GND of the power converter 100, the controller 200 may not require its internal regulation module 201 to be capable of sustaining high voltage. "High voltage" here in an example may refer to voltages higher than the voltage amplitude (e.g. 10V~20V) of the low side switch driving signal VGL, in another example may refer to voltages even higher than 20V up to 100V, or in still another example may refer to voltages higher than 100V up to 1500V. For instance, the internal regulation module 201 may be comprised of low voltage devices (e.g. having break down voltages lower than the voltage amplitude of the input switch driving signal VG(i−1)). Low voltage devices are not only cost effective and size saving but also help to reduce design complexity and power dissipation.

In accordance with an exemplary embodiment, still referring to FIG. 2, the controller 200 may further comprise a phase shift control module 202, coupled to the first terminal G(i), and configured to generate a setting control signal G(i)_S and a resetting control signal G(i)_R based on the input switch driving signal VG(i−1). The setting control signal G(i)_S may be configured to set the output switch driving signal VG(i) at logic high in response to each rising edge of the input switch driving signal VG(i−1) with a $T_{(i-1)}/N$ time delay, and the resetting control signal G(i)_R may be configured to reset the output switch driving signal VG(i) at logic low in response to each falling edge of the input switch driving signal VG(i-1) with a $T_{(i-1)}/N$ time delay, wherein $T_{(i-1)}$ is the switching period of the input switch driving signal VG(i-1) and N is the total number of the plurality of phases of the power converter. That is to say, in response to each rising edge of the input switch driving signal VG(i-1), once a $T_{(i-1)}/N$ time delay has elapsed starting from the moment when the rising edge of the input switch driving signal VG(i-1) comes, the setting control signal G(i)_S may be configured to set the output switch driving signal VG(i) at logic high. In response to each falling edge of the input switch driving signal VG(i-1), once a $T_{(i-1)}/N$ time delay has elapsed starting from the moment when the falling edge of the input switch driving signal VG(i-1) comes, the resetting control signal G(i)_R may be configured to reset the output switch driving signal VG(i) at logic low. In accordance with an embodiment, the phase shift control module 202 may further be coupled to the fifth terminal (e.g. the setting terminal) SET(i) and may be configured to allow customers/users to set the phase shift of $T_{(i-1)}/N$ (i.e. the $T_{(i-1)}/N$ time delay) by connecting an external setting device to the setting terminal SET(i) or by providing a configuration signal to the setting terminal SET(i).

In accordance with an exemplary embodiment, still referring to FIG. 2, the controller 200 may further comprise a logic control module 203 and a driver 204. The logic control module 203 may be configured to at least directly or indirectly receive the setting control signal G(i)_S and the resetting control signal G(i)_R and to provide an output control signal CTRL(i) based at least partially on the setting control signal G(i)_S and the resetting control signal G(i)_R. The driver 204 may be powered by the regulated voltage signal VCC(i) and may be configured to enhance driving capability of the output control signal CTRL(i) to provide the output switch driving signal VG(i). In an embodiment, the logic control module 203 may have a setting input terminal S, a resetting input terminal R, and a non-inverting output terminal Q. In an embodiment, the setting control signal G(i)_S may be directly fed to the setting input terminal S of the logic control module 203 and the logic control module 203 may be configured to set the output control signal CTRL(i) (or the output switch driving signal VG(i)) at logic high in response to each setting pulse 401 of the setting control signal G(i)_S. This is just exemplary and not intended to be limiting, for instance, in other embodiments, simple logic operations (such as an AND logic operation illustrated exemplarily in FIG. 2) may be performed to process the setting control signal G(i)_S and other signals that may be involved in the setting control of the output control signal CTRL(i) (or the output switch driving signal VG(i)) to provide a setting signal ST to the setting input terminal S of the logic control module 203. For example, in an embodiment, other signals that may be involved in the setting control of the output control signal CTRL(i) (or the output switch driving signal VG(i)) may include a valley control signal Valley(i). For this situation, the controller 200 may further comprise a sixth terminal (e.g. a zero cross detection terminal) ZCD(i) that may be coupled to the $i^{th}$ inductive power storage device L(i) of the $i^{th}$ power stage 103(i) through for example an $i^{th}$ zero-cross detection resistor $R_{ZCD(i)}$, for each i from 2 to N (i.e., here i is a variable traverses the integers from 2 to N), when the controller 200 is used for instance as the $i^{th}$ controller 102(i) of the power converter 100. The sixth terminal ZCD(i) may be configured/used to sense a zero current value of a current flowing through the $i^{th}$ inductive power storage device L(i) to provide a zero-cross indication signal and may further be configured to sense a quasi-resonant voltage valley of a voltage across on the $i^{th}$ power switch Q(i) when the controller 200 is used as the $i^{th}$ controller 102(i) for driving the $i^{th}$ power switch Q(i) of one phase (i.e. the $i^{th}$ phase) PHASE(i) of the power converter 100, for each i from 2 to N (i.e., here i is a variable traverses the integers from 2 to N). The controller 200 may further comprise a valley lock module 205 coupled to the sixth terminal (e.g. the zero cross detection terminal) ZCD(i) to receive a signal indicative of the quasi-resonant voltage valley of the voltage across on the $i^{th}$ power switch Q(i). The valley lock module 205 may be configured to lock the number of times that the voltage across on the $i^{th}$ power switch Q(i) reaches the quasi-resonant voltage valley to a predetermined number (e.g. the predetermined number may rang from 1 to 7 or more depending on practical application requirements) to avoid audible noise caused by the valley of the voltage across on the $i^{th}$ power switch Q(i) jumping back and forth. In an alternative embodiment, other signals that may be involved in the setting control of the output control signal CTRL(i) (or the output switch driving signal VG(i)) may further include a minimum off time control signal Toff_min that may be configured to limit a minimum pulse width of a logic low pulse of the output control signal CTRL(i) (or the output switch driving signal VG(i)) during one switching period $T_{(i)}$. For example, when the controller 200 is used as the $i^{th}$ controller 102(i) for driving the $i^{th}$ power switch Q(i) of one phase (i.e. the $i^{th}$ phase) PHASE(i) of the power converter 100, for each i from 2 to N (i.e., here i is a variable traverses the integers from 2 to N), the minimum off time control signal Toff_min may help to limit a maximum switching frequency of the $i^{th}$ power switch Q(i) driven by the output switch driving signal VG(i) and make sure that a discharging time of the $i^{th}$ inductive power storage device L(i) to be enough. The minimum off time control signal Toff_min may also help to enhance noise immunity and prevent false triggering (e.g. false triggering of the zero-cross indication signal caused by ringing due to parasitic capacitances, inductances and resistances etc. in real circuits). In an embodiment, the resetting control signal G(i)_R may be directly fed to the resetting input terminal R of the logic control module 203 and the logic control module 203 may be configured to reset the output control signal CTRL(i) (or the output switch driving signal VG(i)) at logic low in response to each resetting pulse 403 of the resetting control signal G(i)_R. This is just exemplary and not intended to be limiting, for instance, in other embodiments, simple logic operations (such as an OR logic operation illustrated exemplarily in FIG. 2) may be performed to process the resetting control signal G(i)_R and other signals that may be involved in the resetting control of the output control signal CTRL(i) (or the output switch driving signal VG(i)) to provide a resetting signal RST to the resetting input terminal R of the logic control module 203. For example, in an embodiment, other signals that may be involved in the resetting control of the output control signal CTRL(i) (or the output switch driving signal VG(i)) may include a fault indication signal Fault(i). For example, the fault indication signal Fault(i) may be indicative of any type of abnormal conditions of a power converter system (e.g. the power converter 100 when the controller 200 is used as the $i^{th}$ controller 102(i), i from 2 to N), such as an over voltage condition, an over current condition, an over temperature condition, a system idle condition, and etc.

Figure 3:
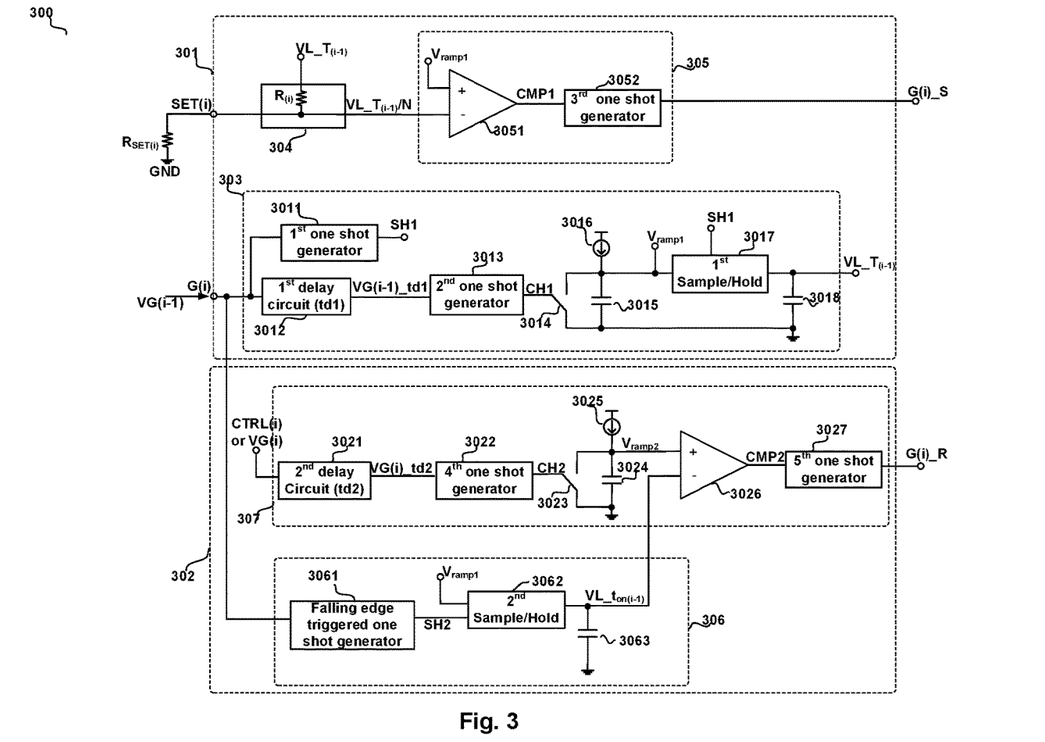
FIG. 3 schematically illustrates a phase shift control module 300 that may be used as the phase shift control module 201 of the controller 200 in accordance with an embodiment of the present invention.
Figure 4:
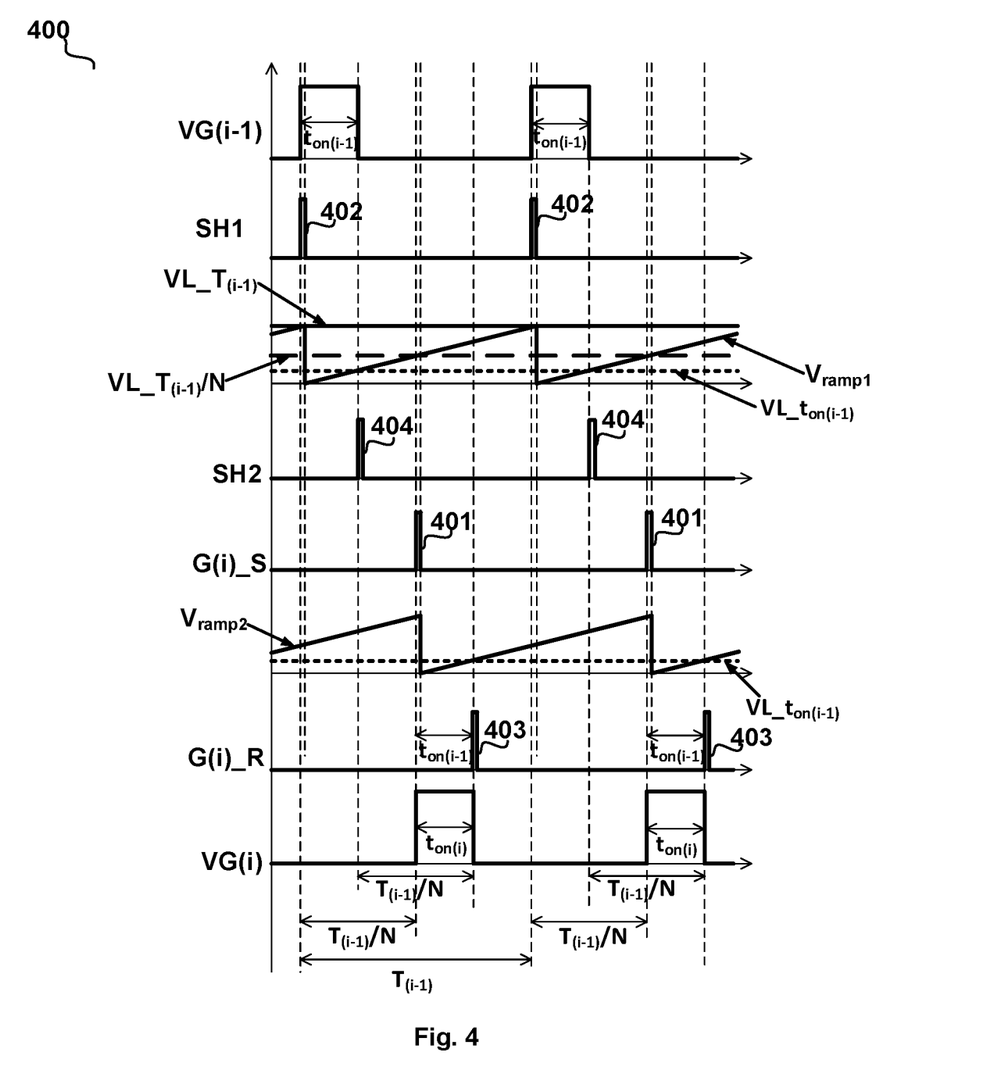
FIG. 4 illustrates a waveform diagram 400 showing waveforms of several signals in the phase shift control module 300 and the controller 200, in accordance with an embodiment of the present invention.

FIG. 3 schematically illustrates a phase shift control module 300 that may be used as the phase shift control module 201 of the controller 200 in accordance with an embodiment of the present invention. The phase shift control module 300 may comprise a setting control module 301 and a resetting control module 302. FIG. 4 illustrates a waveform diagram 400 showing waveforms of several signals in the phase shift control module 300 and the controller 200, in accordance with an embodiment of the present invention.

The setting control module 301 may be coupled to the first terminal G(i) of the controller 200 and may be configured to detect the switching period $T_{(i-1)}$ of the input switch driving signal VG(i−1) (e.g. the $(i-1)^{th}$ switch driving signal VG(i−1) when the controller 200 is used as the $i^{th}$ controller 102(i) of the power converter 100), and may further be configured to generate a setting pulse 401 of the setting control signal G(i)_S in response to each rising edge of the input switch driving signal VG(i−1) with a $T_{(i-1)}/N$ time delay. That is to say, starting from the moment when each rising edge of the input switch driving signal VG(i−1) comes, once a $T_{(i-1)}/N$ time delay has elapsed, the setting control module 301 generates a setting pulse 401 of the setting control signal G(i)_S. Each setting pulse 401 of the setting control signal G(i)_S may be configured to set the output switch driving signal VG(i) (e.g. the $i^{th}$ switch driving signal VG(i) when the controller 200 is used as the $i^{th}$ controller 102(i) of the power converter 100) at logic high. Namely, each setting pulse 401 of the setting control signal G(i)_S triggers a rising edge of the output switch driving signal VG(i). The setting control module 301 may further be coupled to the fifth terminal (e.g. the setting terminal) SET(i) of the controller 200 and may be configured to allow customers/users to set the phase shift of $T_{(i-1)}/N$ (i.e. the $T_{(i-1)}/N$ time delay) by connecting an external setting device to the setting terminal SET(i) or by providing a configuration signal to the setting terminal SET(i). The setting control module 301 may comprise any appropriate circuitry that can detect the switching period $T_{(i-1)}$ of the input switch driving signal VG(i−1) and generate a setting pulse 401 of the setting control signal G(i)_S in response to each rising edge of the input switch driving signal VG(i−1) with a $T_{(i-1)}/N$ time delay.

To provide an example as shown in FIG. 3, the setting control module 301 may comprise a switching period detection circuit 303, a phase shift programming circuit 304 and a setting pulse generation circuit 305. The switching period detection circuit 303 may be configured to receive the input switch driving signal VG(i−1) and detect the switching period $T_{(i-1)}$ of the input switch driving signal VG(i−1) to provide a first voltage signal VL_$T_{(i-1)}$ indicative of the switching period $T_{(i-1)}$. The switching period detection circuit 303 may further be configured to provide a first periodical ramp signal $V_{ramp1}$ having a ramping voltage amplitude indicative of a time elapsed from 0 to $T_{(i-1)}$ during each switching period $T_{(i-1)}$ of the input switch driving signal VG(i−1). In the example of FIG. 3, the switching period detection circuit 303 may comprise a first one shot generator 3011 configured to generate a one shot pulse 402 in response to each rising edge of the input switch driving signal VG(i−1) to provide a first sample control signal SH1. The first sample control signal SH1 thus has a one shot pulse 402 at each rising edge of the input switch driving signal VG(i−1). The switching period detection circuit 303 may further comprise a first delay circuit 3012 configured to add a first predetermined delay time td1 (e.g. ranging from 10 ns to 100 ns depending on the switching period $T_{(i-1)}$ and should not exceed 5% of a minimum value of the switching period $T_{(i-1)}$) to the input switch driving signal VG(i−1) to output a delayed input switch driving signal VG(i−1)_td1, and a second one shot generator 3013 configured to generate a one shot pulse in response to each rising edge of the delayed input switch driving signal VG(i−1)_td1 to provide a first charging control signal CH1. The first charging control signal CH1 thus has a one shot pulse at each rising edge of the delayed input switch driving signal VG(i−1)_td1. The switching period detection circuit 303 may further comprise a first charging control switch 3014, a first capacitor 3015 and a first current source 3016. The first charging control switch 3014 and the first capacitor 3015 may be coupled in parallel between the first current source 3016 and the ground potential (GND), and the first charging control switch 3014 may have a control terminal configured to receive the first charging control signal CH1. Therefore, at each rising edge of the delayed input switch driving signal VG(i−1)_td1, a one shot pulse of the first charging control signal CH1 turns the first charging control switch 3014 on to discharge the first capacitor 3015. The voltage signal across the first capacitor 3015 may be provided as the first periodical ramp signal $V_{ramp1}$. The switching period detection circuit 303 may further comprise a first sample and hold circuit 3017 that may be configured to receive the first periodical ramp signal $V_{ramp1}$ at an input terminal of the first sample and hold circuit 3017, to receive the first sample control signal SH1 at a control terminal of the first sample and hold circuit 3017, and to be coupled to a second capacitor 3018 at an output terminal of the first sample and hold circuit 3017. The first sample and hold circuit 3017 samples the voltage amplitude of the first periodical ramp signal $V_{ramp1}$ in response to each one shot pulse 402 of the first sample control signal SH1, which may be understood as that the first sample and hold circuit 3017 samples the voltage amplitude of the first periodical ramp signal $V_{ramp1}$ at each rising edge of the input switch driving signal VG(i−1), and then holds the sampled voltage amplitude to provide the first voltage signal VL_$T_{(i-1)}$ at the output terminal of the first sample and hold circuit 3017.

The phase shift programming circuit 304 may be coupled to the switching period detection circuit 303 to receive the first voltage signal VL_$T_{(i-1)}$, and may further be coupled to the fifth terminal (e.g. the setting terminal) SET(i) of the controller 200 so as to be connected to an external setting device or to receive a configuration signal. The phase shift programming circuit 304 may be configured to allow customers/users to set the first voltage signal VL_$T_{(i-1)}$ to be divided by N when the controller 200 is used in multi-phase applications for example having N phases (e.g. when used in the N-phase power converter 100), providing a divided voltage signal VL_$T_{(i-1)}/N$ (illustrated by a dashed line in FIG. 4) indicative of the $T_{(i-1)}/N$ time delay. In the example of FIG. 3, the phase shift programming circuit 304 is simply illustrated as to comprise a resister having a resistance value of $R_{(i)}$, customers/users may connect an external setting resistor having a resistance value of $R_{SET(i)}$, wherein $R_{SET(i)}=(N-1)*R_{(i)}$. This is just to provide an example and not intended to be limiting. One of ordinary skill in the art should understand that the phase shift programming circuit 304 may comprise any suitable circuitry that allow customers/users to set the first voltage signal VL_$T_{(i-1)}$ to be divided by N to provide the divided voltage signal VL_$T_{(i-1)}/N$ depending on the number N of phases that the power converter in which the controller 200 is used has.

The setting pulse generation circuit 305 may be configured to receive the divided voltage signal VL_$T_{(i-1)}/N$ and the first periodical ramp signal $V_{ramp1}$ and to generate a one shot pulse 401 each time when the first periodical ramp signal $V_{ramp1}$ reaches the divided voltage signal $VL\_T_{(i-1)}/N$ to provide the setting control signal G(i)_S. The setting control signal G(i)_S thus has a one shot pulse 401 (used as a setting pulse 401) at each moment when the first periodical ramp signal $V_{ramp1}$ reaches the divided voltage signal $VL\_T_{(i-1)}/N$. Those of ordinary skill in the art would understand that each moment when the first periodical ramp signal $V_{ramp1}$ reaches the divided voltage signal $VL\_T_{(i-1)}/N$ actually corresponds to each $T_{(i-1)}/N$ time delayed rising edge of the input switch driving signal VG(i−1), i.e. moment of each rising edge of the input switch driving signal VG(i−1) phase-shifted/delayed by $T_{(i-1)}/N$. In the example of FIG. 3, the setting pulse generation circuit 305 may comprise: a first comparator 3051 configured to receive the divided voltage signal $VL\_T_{(i-1)}/N$ at a first terminal (e.g. the inverting input terminal "−" in FIG. 3) of the first comparator 3051, to receive the first periodical ramp signal $V_{ramp1}$ at a second terminal (e.g. the non-inverting input terminal "+" in FIG. 3) of the first comparator 3051, and to compare first periodical ramp signal $V_{ramp1}$ with the divided voltage signal $VL\_T_{(i-1)}/N$ to provide a first comparison signal CMP1 at an output terminal of the first comparator 3051. The setting pulse generation circuit 305 may further comprise: a third one shot generator 3052 configured to generate a one shot pulse (e.g. used as a setting pulse 401) in response to the first comparison signal CMP1 each time when the first periodical ramp signal $V_{ramp1}$ reaches the divided voltage signal $VL\_T_{(i-1)}/N$ to provide the setting control signal G(i)_S.

The resetting control module 302 may be coupled to the first terminal G(i) of the controller 200 and may be configured to detect a pulse width $t_{on(i-1)}$ of the of the input switch driving signal VG(i−1) (e.g. the (i−1)$^{th}$ switch driving signal VG(i−1) when the controller 200 is used as the i$^{th}$ controller 102(i) of the power converter 100), and may further be configured to generate a resetting pulse 403 of the resetting control signal G(i)_R in response to each rising edge of the output switch driving signal VG(i) (or in response to each setting pulse 401 of the setting control signal G(i)_S) with the pulse width $t_{on(i-1)}$ of the input switch driving signal VG(i−1) elapsed. That is to say, starting from the moment when each rising edge of the output switch driving signal VG(i) (or each setting pulse 401 of the setting control signal G(i)_S) comes, once a $t_{on(i-1)}$ duration that equals to the pulse width $t_{on(i-1)}$ of the input switch driving signal VG(i−1) has elapsed, the resetting control module 302 generates a resetting pulse 403 of the resetting control signal G(i)_R. Each resetting pulse 403 of the resetting control signal G(i)_R may be configured to reset the output switch driving signal VG(i) (e.g. the i$^{th}$ switch driving signal VG(i) when the controller 200 is used as the i$^{th}$ controller 102(i) of the power converter 100) at logic low. Namely, each resetting pulse 403 of the resetting control signal G(i)_R triggers a falling edge of the output switch driving signal VG(i). The resetting control module 302 may comprise any appropriate circuitry that can detect the pulse width $t_{on(i-1)}$ of the input switch driving signal VG(i−1) and generate a resetting pulse 403 of the resetting control signal G(i)_R in response to each rising edge of the output switch driving signal VG(i) with a $t_{on(i-1)}$ time delay.

To provide an example as shown in FIG. 3, the resetting control module 302 may comprise a pulse width detection circuit 306 and a resetting pulse generation circuit 307. The pulse width detection circuit 306 may be configured to receive the input switch driving signal VG(i−1) and detect the pulse width $t_{on(i-1)}$ of the input switch driving signal VG(i−1) to provide a second voltage signal $VL\_t_{on(i-1)}$ (illustrated by a dotted line in FIG. 4) indicative of the pulse width $t_{on(i-1)}$. In the example of FIG. 3, the pulse width detection circuit 306 may comprise a falling edge triggered one shot generator 3061 configured to generate a one shot pulse 404 in response to each falling edge of the input switch driving signal VG(i−1) to provide a second sample control signal SH2. The second sample control signal SH2 thus has a one shot pulse 404 at each falling edge of the input switch driving signal VG(i−1). The pulse width detection circuit 306 may further comprise a second sample and hold circuit 3062 that may be configured to receive the first periodical ramp signal $V_{ramp1}$ at an input terminal of the second sample and hold circuit 3062, to receive the second sample control signal SH2 at a control terminal of the second sample and hold circuit 3062, and to be coupled to a third capacitor 3063 at an output terminal of the second sample and hold circuit 3062. The second sample and hold circuit 3062 samples the voltage amplitude of the first periodical ramp signal $V_{ramp1}$ in response to each one shot pulse 404 of the second sample control signal SH2, which may be understood as that the second sample and hold circuit 3062 samples the voltage amplitude of the first periodical ramp signal $V_{ramp1}$ at each falling edge of the input switch driving signal VG(i−1), and then holds the sampled voltage amplitude to provide the second voltage signal $VL\_t_{on(i-1)}$ at the output terminal of the second sample and hold circuit 3062.

The resetting pulse generation circuit 307 may be configured to receive the output switch driving signal VG(i) or the output control signal CTRL(i) and to provide a second periodical ramp signal $V_{ramp2}$ having a ramping voltage amplitude indicative of a time elapsed from 0 to $T_{(i)}$ during each switching period $T_{(i)}$ of the output switch driving signal VG(i). The resetting pulse generation circuit 307 may further be configured to receive the second voltage signal $VL\_t_{on(i-1)}$ and to generate a one shot pulse each time when the second periodical ramp signal $V_{ramp2}$ reaches the second voltage signal $VL\_t_{on(i-1)}$ to provide the resetting control signal G(i)_R. The resetting control signal G(i)_R thus has a one shot pulse (used as a resetting pulse 403) at each moment when the second periodical ramp signal $V_{ramp2}$ reaches the second voltage signal $VL\_t_{on(i-1)}$. Those of ordinary skill in the art would understand that each moment when the second periodical ramp signal $V_{ramp2}$ reaches the second voltage signal $VL\_t_{on(i-1)}$ actually corresponds to each $t_{on(i-1)}$ time delayed rising edge of the output switch driving signal VG(i), i.e. moment of each rising edge of the output switch driving signal VG(i) phase-shifted/delayed by $t_{on(i-1)}$.

In the example of FIG. 3, the resetting pulse generation circuit 307 may comprise a second delay circuit 3021 configured to add a second predetermined delay time td2 (e.g. ranging from 10 ns to 100 ns and should ideally match with the first predetermined delay time td1, i.e. td2=td1) to the output switch driving signal VG(i) or the output control signal CTRL(i) to output a delayed output switch driving signal VG(i)_td2, and a fourth one shot generator 3022 configured to generate a one shot pulse in response to each rising edge of the delayed output switch driving signal VG(i)_td2 to provide a second charging control signal CH2. The second charging control signal CH2 thus has a one shot pulse at each rising edge of the delayed output switch driving signal VG(i)_td2. The resetting pulse generation circuit 307 may further comprise a second charging control switch 3023, a fourth capacitor 3024 and a second current source 3025. The second charging control switch 3023 and the fourth capacitor 3024 may be coupled in parallel between the second current source 3016 and ground, and the second charging control switch 3023 may have a control terminal configured to receive the second charging control signal CH2. Therefore, at each rising edge of the delayed output switch driving signal VG(i)_td2, a one shot pulse of the second charging control signal CH2 turns the second charging control switch 3023 on to discharge the fourth capacitor 3024. The voltage signal across the fourth capacitor 3024 may be provided as the second periodical ramp signal $V_{ramp2}$. The resetting pulse generation circuit 307 may further comprise: a second comparator 3026 configured to receive the second voltage signal $VL\_t_{on(i-1)}$ at a first terminal (e.g. the inverting input terminal "−" in FIG. 3) of the second comparator 3026, to receive the second periodical ramp signal $V_{ramp2}$ at a second terminal (e.g. the non-inverting input terminal "+" in FIG. 3) of the second comparator 3026, and to compare second periodical ramp signal $V_{ramp2}$ with the second voltage signal $VL\_t_{on(i-1)}$ to provide a second comparison signal CMP2 at an output terminal of the second comparator 3026. The resetting pulse generation circuit 307 may further comprise: a fifth one shot generator 3027 configured to generate a one shot pulse (e.g. used as a resetting pulse 403) in response to the second comparison signal CMP2 each time when the second periodical ramp signal $V_{ramp2}$ reaches the second voltage signal $VL\_t_{on(i-1)}$ to provide the resetting control signal G(i)_R.

One of ordinary skill in the art should understand that the phase shift control module 300 described here with reference to FIG. 3 is just exemplary and not intended to be limiting. Many modifications and variations to the phase shift control module are possible in light of the above teachings. The phase shift control module 300 may comprise any appropriate circuitry that can detect the switching period $T_{(i-1)}$ to generate a setting pulse 401 of the setting control signal G(i)_S in response to each rising edge of the input switch driving signal VG(i−1) with a $T_{(i-1)}/N$ time delay, and can detect the pulse width $t_{on(i-1)}$ of the input switch driving signal VG(i−1) to generate a resetting pulse 403 of the resetting control signal G(i)_R in response to each rising edge of the output switch driving signal VG(i) (or in response to each setting pulse 401 of the setting control signal G(i)_S) with the pulse width $t_{on(i-1)}$ of the input switch driving signal VG(i−1) elapsed. One of ordinary skill in the art should also understand that the terms "first", "second", "third", "fourth", "fifth" when mentioned in the above descriptions related to FIG. 3 do not refer to any order/sequence but are just used to distinguish different circuit elements and different signals from each other. For example, using "first" and "second" to differentiate the first periodical ramp signal $V_{ramp1}$ and the second periodical ramp signal $V_{ramp2}$, the first voltage signal $VL\_T_{(i-1)}$ and second voltage signal $VL\_t_{on(i-1)}$, the first sample and hold circuit 3017 and the second sample and hold circuit 3062, the first delay circuit 3012 and the second delay circuit 3021, the first comparator 3051 and the second comparator 3026, the first sample control signal SH1 and the second sample control signal SH2, the first charging control switch 3014 and the second charging control switch 3023, the first current source 3016 and the second current source 3025, the first charging control signal CH1 and the second charging control signal CH2; using "first", "second" and "third" and "fourth" to differentiate the first capacitor 3015, the second capacitor 3018 the third capacitor 3063 and the fourth capacitor 3024; using "first", "second", "third", "fourth", and "fifth" to differentiate the first one shot generator 3011, the second one shot generator 3013, the third one shot generator 3022, the fourth one shot generator 3022 and the fifth one shot generator 3027.

FIG. 5 schematically illustrates a power converter 500 in accordance with another exemplary embodiment of the present invention using the "universal" controller (such as the controller 200) as slave controllers to co-work with a master controller 502(1). Similar to the power converter 100 shown in FIG. 1, the power converter 500 in FIG. 5 may include a rectification unit 501 for rectifying an alternating current ("AC") input signal VAC to output a rectified direct current ("DC") supply signal VIN, and a plurality of N power conversion phases {PHASE(i), i=1, 2, . . . , N} coupled in parallel between a first node (e.g. a DC input node) IN and a second node (e.g. an output node) OUT, wherein N is an integer greater than 1 and represents the total number of power conversion phases that the power converter 500 may include which may be set or determined by customers/users in practical applications depending on real application requirements. That is to say, the indice i is a variable traverses the integers from 1 to N. Each one of the plurality of (e.g. N) power conversion phases (including all the sub-circuits and elements that each power conversion phase may comprise) may be configured to use a reference ground potential at a third node GND of the power converter 500 as a ground potential of each power conversion phase. An input capacitor $C_{IN1}$ may be coupled across the first node IN and the third node GND of the power converter 500. The first node IN may be configured to receive the rectified DC supply signal VIN in an embodiment. An output capacitor Co may be coupled across the second node OUT and the third node GND of the power converter 500.

In the example of FIG. 5, the rectification unit 501 may exemplarily comprise four diodes connected into a full bridge BD1 having a first terminal b1 coupled to a first winding of an inductive device (e.g. a transformer) $L_{CM1}$, a second terminal b2 connected to the first node IN, a third terminal b3 connected to a second winding of the inductive device $L_{CM1}$ and a fourth terminal b4 connected to the third node GND of the power converter 500. For the rectification unit 501, a first terminal a1 of an AC source may be coupled to the second winding of the inductive device $L_{CM1}$ via a fuse F1, and a second terminal a2 of the AC source may be coupled to the first winding of the inductive device $L_{CM1}$, a capacitive device CX1 may be coupled between the first terminal a1 and the second terminal a2 of the AC source, and another capacitive device CX2 may be coupled between the first terminal b1 and the third terminal b3 of the full bridge BD1. The AC source may be configured to provide the AC input signal VAC.

Similar as the power converter 100, for each i from 1 to N, the $i^{th}$ power conversion phase PHASE(i) of the N power conversion phases {PHASE(i), i=1, 2, . . . , N} of the power converter 500 may comprise an $i^{th}$ power stage 503(*i*) including an $i^{th}$ power switch Q(i) and a corresponding $i^{th}$ controller 502(*i*) for driving the $i^{th}$ power switch Q(i) to perform on and off switching. Therefore, it would be understood that the power converter 500 having the N power conversion phases {PHASE(i), i=1, 2, . . . , N} may include N power switches {Q(i), i=1, 2, . . . , N} and N controllers {502(*i*), i=1, 2, . . . , N}, with each one of the N controllers {502(*i*), i=1, 2, . . . , N} configured to drive a corresponding one of the N power switches {Q(i), i=1, 2, . . . , N} in a corresponding one of the N power conversion phases {PHASE(i), i=1, 2, . . . , N}. In an embodiment, the first power conversion phase PHASE(1) of the N power conversion phases {PHASE(i), i=1, 2, . . . , N} may be configured as a master phase, and the first controller 502(1) of the N controllers {502(*i*), i=1, 2, . . . , N} may be configured as a master controller to provide a first switch driving signal VG(1). The first switch driving signal VG(1) may be a high-low logic switching signal having a switching period $T_{(1)}$, and a high logic pulse and a low logic pulse in each switching period $T_{(1)}$, and may be configured to drive the first power switch Q(1) of the N power switches {Q(i), i=1, 2, . . . , N}.

In the exemplary embodiment shown in FIG. 5, for each i from 1 to N, the $i^{th}$ power stage 503(i) of the $i^{th}$ power conversion phase PHASE(i) may be configured to have a flyback topology. For instance, for each i from 1 to N, the $i^{th}$ power stage 503(i) may comprise the $i^{th}$ power switch Q(i) having a first terminal D coupled to the first node IN through a primary winding w1 of an $i^{th}$ inductive power storage device L(i), a second terminal S coupled to the third node GND, and a control terminal G coupled to the $i^{th}$ controller 502(i) e.g. with or without a gating resistive device $R_{G(i)}$. The gating resistive device $R_{G(i)}$ may comprise parasitic resistances. In an embodiment, for each i from 1 to N, the first terminal D of the $i^{th}$ power switch Q(i) may further be coupled to a node NP through an $i^{th}$ primary diode $DP_{(i)}$, the node NP being connected to the first node IN of the power converter 500 through a second input capacitor $C_{IN2}$ and a second input resistor $R_{IN2}$ connected in parallel between the first node IN and the node NP. A secondary winding w2 of the $i^{th}$ inductive power storage device L(i) may be coupled to the second node OUT of the power converter 500 through for example an $i^{th}$ secondary diode $D_{S(i)}$, for each i from 1 to N. The first controller 502(1) configured as a master controller may comprise any controller suitable to generate a master switch driving signal (i.e. the first switch driving signal VG(1)) to drive the first power stage 503(1) having the flyback topology. For instance, the commercially available controller MPX2001/2/3, HFC0300, HFC0310, HFC0500, HFC0650 manufactured by Monolithic Power System Inc. may be used as the first controller 502(1). In the example of FIG. 5, the first controller 502(1) may have a first terminal (e.g. a feedback terminal) FB that may be configured/used to receive a feedback signal indicative of an output voltage (also labeled with VO for brevity) at the second node OUT of the power converter 500, a second terminal (e.g. a driver output terminal) DRV(1) that may be configured/used to provide the first switch driving signal VG(1), a third terminal (e.g. a regulated power terminal) VC(1) that may be configured/used to allow connection to an auxiliary winding w3 of the first inductive power storage device L(1) for drawing energy to generate a regulated voltage signal VCC(1) that may be used as an internal supply voltage for the first controller 502(1), and a fourth terminal (e.g. a ground terminal) GND that may be configured/used to allow connection to the reference ground potential of the power converter 500. A diode $D_{VC}$ may be coupled between the third terminal VC(1) of the first controller 502(1) and the auxiliary winding w3 of the first inductive power storage device L(1) to prevent reverse charging from the third terminal VC(1) to the auxiliary winding w3. The first controller 502(1) may at least comprise a voltage feedback loop that may be configured to generate the first switch driving signal VG(1) based at least partially on the feedback signal received at the first terminal FB. The first controller 502(1) may further comprise other terminals, for example a fifth terminal (e.g. a current sense terminal) CS that may be configured/used to sense a current flowing through the first power switch Q(1) to generate a current sense signal. For this situation, a first current sense resistor $R_{S1}$ may be coupled between the fifth terminal CS of the first controller 502(1) and the second terminal S of the first power switch Q(1), and a second current sense resistor $R_{S2}$ may be coupled between the second terminal S of the first power switch Q(1) and the third node GND of the power converter 500. The first controller 502(1) may further be configured to regulate the first switch driving signal VG(1) based on the current sense signal. The first controller 502(1) may further comprise a sixth terminal (e.g. a zero-cross detection ("ZCD") terminal) ZCD(1) that may be configured/used to allow connection e.g. through a first ZCD resistor $R_{ZCL(1)}$ to the auxiliary winding w3 of the first inductive power storage device L(1) to detect whether a current flowing through the first inductive power storage device L(1) crosses zero. A resistor $R_{ZCU(1)}$ may be coupled between the diode DVC and the first ZCD resistor $R_{ZCL(1)}$. The first controller 102(1) may further comprise a seventh terminal (e.g. a power supply terminal) HV that may be configured/used to sense a rectified voltage of the AC input signal VAC and a voltage on the seventh terminal HV may be used for providing brown-in and brownout protections, high voltage start-up and X-cap discharging functions for AC-DC applications. In the example of FIG. 1, it is exemplarily illustrated that the seventh terminal HV is coupled to the first winding of the inductive device $L_{CM1}$ through a first input resistor $R_{IN1}$ and a first input diode $D_{IN1}$, and further coupled to the first terminal b1 or the third terminal b3 of the full bridge BD1 through the first input resistor $R_{IN1}$ and a second input diode $D_{IN2}$ to sense the rectified voltage of the AC input signal VAC. One of ordinary skill in the art should understand that this is just to provide an example and not intended to be limiting.

In the exemplary embodiment shown in FIG. 5, for each i from 2 to N (i.e., here i is a variable traverses the integers from 2 to N), the $i^{th}$ controller 502(i) of the N controllers {502(i), i=1, 2, . . . , N} may be configured/used as a slave controller and may comprise the same structures and have similar functions as the $i^{th}$ controller 102(i) described with reference to FIG. 1. Thus, for each i from 2 to N (i.e., here i is a variable traverses the integers from 2 to N), all the descriptions to the $i^{th}$ controller 102(i) of the power converter 100 apply for the $i^{th}$ controller 502(i) of the power converter 500 and will not be repeated here.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

In some embodiments, for each i from 1 to N, the diodes $D_{(i)}$ in FIG. 1 and $DP_{(i)}$ and $D_{S(i)}$ in FIG. 5 could be controllable rectifier switches, and the power switches Q(i) in the power stages 103(i) and 503(i) can be controllable semiconductor devices other than MOSFETs. Those skilled in the art can also understand that, in addition to the flyback and boost PFC topologies shown in the foregoing embodiments, some other interleaving multiphase power converters can also adopt the "universal" controller 200 as slave controller, without departing from the scope of the present invention.

What is claimed is:

1. A power converter having a plurality of N phases with each one of the N phases comprising a power switch, N being an integer greater than 1 and representing the total number of phases that the power converter has, the power converter comprising:
   a corresponding plurality of N controllers, corresponding to the plurality of N phases, wherein each one of the N controllers is configured to drive a corresponding one power switch in a corresponding one phase of the plurality of N phases; and wherein
   the first controller of the plurality of N controllers is configured as a master controller to provide a first switch driving signal; and wherein
   for each i from 2 to N, the $i^{th}$ controller of the plurality of N controllers is configured to receive the $(i-1)^{th}$ switch driving signal from the $(i-1)^{th}$ controller at a first terminal of the $i^{th}$ controller, and is further configured to draw power from the $(i-1)^{th}$ switch driving signal, and is further configured to provide an $i^{th}$ switch driving signal at a second terminal of the $i^{th}$ controller based on the $(i-1)^{th}$ switch driving signal, and wherein i is an integer.

2. The power converter of claim 1, wherein for each i from 2 to N, the $i^{th}$ controller is further configured to phase shift the $(i-1)^{th}$ switch driving signal by $T_{(i-1)}/N$ to generate the $i^{th}$ switch driving signal, wherein $T_{(i-1)}$ is a switching period of the $(i-1)^{th}$ switch driving signal.

3. The power converter of claim 1, wherein for each i from 2 to N, the $i^{th}$ switch driving signal is phase shifted by $T_{(i-1)}/N$ from the $(i-1)^{th}$ switch driving signal and has a pulse width substantially equal to a pulse width of the $(i-1)^{th}$ switch driving signal, and wherein $T_{(i-1)}$ is a switching period of the $(i-1)^{th}$ switch driving signal.

4. The power converter of claim 1, wherein for each i from 2 to N, the $i^{th}$ controller is further configured to provide a regulated voltage signal when a capacitive energy storage device is coupled between a third terminal and a fourth terminal of the $i^{th}$ controller.

5. The power converter of claim 4, wherein for each i from 2 to N, the $i^{th}$ controller further comprises:
   an internal regulation module, coupled between the first terminal and the third terminal of the $i^{th}$ controller, and configured to convert the $(i-1)^{th}$ switch driving signal into the regulated voltage signal when the capacitive energy storage device is coupled between the third terminal and the fourth terminal of the $i^{th}$ controller.

6. The power converter of claim 1, wherein for each i from 2 to N, the $i^{th}$ controller further comprises:
   a phase shift control module, coupled to the first terminal of the $i^{th}$ controller, and configured to generate a setting control signal and a resetting control signal based on the $(i-1)^{th}$ switch driving signal, wherein the setting control signal is configured to set the $i^{th}$ switch driving signal at logic high in response to each rising edge of the $(i-1)^{th}$ switch driving signal with a $T_{(i-1)}/N$ delay, and wherein the resetting control signal is configured to reset the $i^{th}$ switch driving signal at logic low in response to each falling edge of the $(i-1)^{th}$ switch driving signal with a $T_{(i-1)}/N$ delay, and wherein $T_{(i-1)}$ is a switching period of the $(i-1)^{th}$ switch driving signal.

7. The power converter of claim 6, wherein for each i from 2 to N, the phase shift control module of the $i^{th}$ controller is further configured to detect the switching period $T_{(i-1)}$ of the $(i-1)^{th}$ switch driving signal.

8. The power converter of claim 7, wherein for each i from 2 to N, the phase shift control module of the $i^{th}$ controller is further configured to set the $T_{(i-1)}/N$ delay.

9. The power converter of claim 6, wherein for each i from 2 to N, the phase shift control module of the $i^{th}$ controller comprises:
   a setting control module, coupled to the first terminal of the $i^{th}$ controller, configured to detect the switching period $T_{(i-1)}$ of the $(i-1)^{th}$ switch driving signal, and further configured to generate a setting pulse of the setting control signal in response to each rising edge of the $(i-1)^{th}$ switch driving signal with a $T_{(i-1)}/N$ delay, wherein each setting pulse of the setting control signal is configured to set the $i^{th}$ switch driving signal at logic high, and
   a resetting control module, coupled to the first terminal of the $i^{th}$ controller, configured to detect a pulse width $t_{on(i-1)}$ of the $(i-1)^{th}$ switch driving signal, and further configured to generate a resetting pulse of the resetting control signal in response to each rising edge of the $i^{th}$ switch driving signal with the pulse width $t_{on(i-1)}$ of the $(i-1)^{th}$ switch driving signal elapsed, wherein each resetting pulse of the resetting control signal is configured to reset the $i^{th}$ switch driving signal at logic low.

10. The power converter of claim 6, wherein for each i from 2 to N, the $i^{th}$ controller further comprises:
    a setting terminal, coupled to the phase shift control module and configurable to set the $T_{(i-1)}/N$ delay by connecting to an external setting device or by receiving a configuration signal.

11. The power converter of claim 1, wherein for each i from 2 to N, the $i^{th}$ controller further comprises:
    a setting terminal, configurable to set a phase shift of $T_{(i-1)}/N$ to the $i^{th}$ switch driving signal from the $(i-1)^{th}$ switch driving signal, and wherein $T_{(i-1)}$ is a switching period of the $(i-1)^{th}$ switch driving signal.

12. A controller for driving a power switch in one phase of a power converter having a plurality of phases, the controller comprising:
    a first terminal, configured to receive an input switch driving signal which is used to drive a power switch in another phase of the power converter; and
    a second terminal, configured to provide an output switch driving signal to drive the power switch in the one phase; wherein
    the controller is configured to draw power from the input switch driving signal received at the first terminal, and is further configured to provide the output switch driving signal based on the input switch driving signal.

13. The controller of claim 12, wherein the controller is further configured to phase shift the input switch driving signal by $T_{(i-1)}/N$ to generate the output switch driving signal, wherein $T_{(i-1)}$ is a switching period of the input switch driving signal, and wherein N is the total number of the plurality of phases of the power converter.

14. The controller of claim 13, wherein the one phase is the $i^{th}$ phase of the N phases of the power converter, and wherein the another phase is the $(i-1)^{th}$ phase of the N phases of the power converter, and wherein i is an integer from 2 to N.

15. The controller of claim 12, wherein the controller is further configured to provide a regulated voltage signal when a capacitive energy storage device is coupled between a third terminal and a fourth terminal of the controller.

16. The controller of claim 15, further comprising:
    an internal regulation module, coupled between the first terminal and the third terminal of the controller, and configured to convert the input switch driving signal into the regulated voltage signal when the capacitive energy storage device is coupled between the third terminal and the fourth terminal of the controller.

17. The controller of claim 12, further comprising:
a phase shift control module, coupled to the first terminal, and configured to generate a setting control signal and a resetting control signal based on the input switch driving signal, wherein the setting control signal is configured to set the output switch driving signal at logic high in response to each rising edge of the input switch driving signal with a $T_{(i-1)}/N$ delay, and wherein the resetting control signal is configured to reset the output switch driving signal at logic low in response to each falling edge of the input switch driving signal with a $T_{(i-1)}/N$ delay, and wherein $T_{(i-1)}$ is a switching period of the input switch driving signal, and wherein N is the total number of the plurality of phases of the power converter.

18. The controller of claim 12, further comprising:
a setting terminal, configurable to set a phase shift of $T_{(i-1)}/N$ to the output switch driving signal from the input switch driving signal, and wherein $T_{(i-1)}$ is a switching period of the input switch driving signal, and wherein N is the total number of the plurality of phases of the power converter.

19. A power converter comprising:
a first controller, configured as a master controller to provide a first switch driving signal to drive a power switch in a master phase of the power converter, and
a second controller, configured as a slave controller to receive the first switch driving signal from the master controller, and is further configured to draw power from the first switch driving signal, and is further configured to provide a second switch driving signal based on the first switch driving signal.

20. The power converter of claim 19, further comprising:
a third controller, configured to receive the second switch driving signal, and is further configured to draw power from the second switch driving signal, and is further configured to provide a third switch driving signal based on the second switch driving signal.

\* \* \* \* \*